United States Patent [19]

Sommers et al.

[11] Patent Number: 5,284,639
[45] Date of Patent: * Feb. 8, 1994

[54] METHOD FOR THE PREPARATION OF NIOBIUM NITRIDE

[75] Inventors: James H. Sommers, Albany; Lloyd J. Fenwick, Corvallis, both of Oreg.

[73] Assignee: Teledyne Industries, Inc., Albany, Oreg.

[*] Notice: The portion of the term of this patent subsequent to May 18, 2010 has been disclaimed.

[21] Appl. No.: 908,797

[22] Filed: Jul. 6, 1992

Related U.S. Application Data

[63] Continuation of Ser. No. 721,887, Jun. 27, 1991, abandoned.

[51] Int. Cl.$^5$ .................. C01B 21/068; C01B 21/076; C01B 21/06
[52] U.S. Cl. .................. 423/344; 423/406; 423/409; 423/411
[58] Field of Search .......... 423/62, 324, 344, 409, 423/411, 592, 644; 501/96, 87, 88, 96

[56] References Cited

U.S. PATENT DOCUMENTS

| | | | |
|---|---|---|---|
| 2,164,198 | 6/1939 | Clements et al. | 148/4 |
| 2,474,021 | 6/1949 | Vining | 23/184 |
| 2,553,444 | 5/1951 | Dunn et al. | 241/20 |
| 2,682,445 | 6/1954 | Basel | 23/87 |
| 2,849,275 | 8/1958 | Bleecker | 23/14 |
| 2,886,616 | 5/1959 | Mertz et al. | 260/683.15 |
| 3,053,620 | 9/1962 | Greenberg et al. | 23/87 |
| 3,230,077 | 1/1966 | Hiller | 75/84.5 |
| 3,300,297 | 1/1967 | Fields | 75/24 |
| 3,322,510 | 5/1967 | Anselin et al. | 23/347 |
| 3,356,513 | 12/1967 | Washburn | 106/55 |
| 3,425,826 | 2/1969 | Schmidt et al. | 75/84 |
| 3,461,190 | 5/1969 | Kemeny | 263/52 |
| 3,539,165 | 11/1970 | Ingels | 263/40 |
| 3,573,000 | 3/1971 | Toomey et al. | 23/277 |
| 3,639,101 | 2/1972 | Washburn | 23/203 R |
| 3,854,882 | 12/1974 | Washburn | 23/253 A |
| 3,999,981 | 12/1976 | Brandstatter | 75/84 |
| 4,029,740 | 6/1977 | Ervin, Jr. | 423/251 |
| 4,211,754 | 7/1980 | Van Hecke et al. | 423/62 |
| 4,318,897 | 3/1982 | Gonczy | 423/64 X |
| 4,425,318 | 1/1984 | Maeland et al. | 423/644 |
| 4,440,737 | 4/1984 | Libowitz et al. | 423/644 |
| 4,607,826 | 8/1986 | Ron | 266/251 |
| 4,720,300 | 1/1988 | Nishizawa et al. | 75/85.4 |
| 4,727,928 | 3/1988 | De Vynck et al. | 164/469 |
| 4,728,507 | 3/1988 | Worcester | 423/645 |
| 4,741,894 | 5/1988 | Melas | 423/592 |
| 4,812,301 | 3/1989 | Davidson et al. | 423/440 |
| 4,913,778 | 4/1990 | Lee et al. | 203/29 |

FOREIGN PATENT DOCUMENTS

| | | | |
|---|---|---|---|
| 470022 | 12/1950 | Canada . | |
| 541516 | 5/1957 | Canada | 75/622 |
| 541517 | 5/1957 | Canada | 75/622 |
| 554840 | 3/1958 | Canada . | |
| 903034 | 2/1954 | Fed. Rep. of Germany . | |
| 1068683 | 11/1959 | Fed. Rep. of Germany . | |
| 1082240 | 5/1960 | Fed. Rep. of Germany . | |
| 339426 | 2/1991 | Japan . | |
| 485021 | 6/1938 | United Kingdom . | |
| 660397 | 11/1951 | United Kingdom . | |
| 771144 | 3/1957 | United Kingdom . | |
| 866771 | 5/1961 | United Kingdom . | |
| 910289 | 11/1962 | United Kingdom . | |
| 1211757 | 3/1973 | United Kingdom . | |

OTHER PUBLICATIONS

Hattangadi, "How to Set a Periodic Table" *Industrial Chemist*, vol. 9, No. 5, 1988, pp. 20-23.

(List continued on next page.)

*Primary Examiner*—Michael Lewis
*Assistant Examiner*—Stephen G. Kalinchak
*Attorney, Agent, or Firm*—Shoemaker & Mattare, Ltd.

[57] ABSTRACT

A method is disclosed for preparing and recovering metal nitrides from their ferrometal alloys and nickel metal alloys. Exemplary steps of the process involve niobium nitride prepared from ferroniobium alloys (FeNb) which are first hydrided to provide a friable, comminutable product which is then nitrided under conditions which form distinct phases of iron nitride and niobium nitride respectively.

10 Claims, 3 Drawing Sheets

OTHER PUBLICATIONS

Mellor, "A Comprehensive Treatise on Inorganic Chemistry", vol. VIII, Longmans, Green & Co., 1947, pp. 124–126.

Hart, The Reduction of Columbic Acid and the Measurement of the Oxidation Potential of the Pentavalent-Trivalent Columbium System, 226–227, 1926.

Sherwood, Columbium, Rare Metals Handbook, pp. 149–177.

McClain et al., Zirconium-Hafnium Separation, Chapter 4, pp. 64–73, 1960.

Kroll et al., Pilot Plants, Production of Malleable Zirconium, vol. 42, No. 2, pp. 395–396, 1950.

Fairgrieve et al., Hafnium, Molybdenum Techniques Revealed, Journal of Metals, pp. 25–26, 1960.

Spink, Fused-Salt Scrubbing of Zirconium Tetrachloride, Transactions Aime, vol. 224, pp. 965–970, 1962.

Fairbrother, The Chemistry of Niobium and Tantalum, pp. 4, 5, 8–19, 1967.

de Hoboken, Production of Tantalum and/or Columbium, pp. 1–6.

Pennington, Derivatives of Columbium and Tantalum, 1985.

Duke, Resources and Planning Advisory Council, vol. VIII, pp. 1–51, 1969.

Stuart, Niobium, Proceedings of the International Symposium, pp. 3–16; 1237–1249, 1981.

Gibalo, Analytical Chemistry of Niobium and Tantalum, pp. 118–140, 1970.

Merrill, The Separation of Columbium and Tantalum by Means of Selenium Oxychloride, pp. 2378–2383, 1921.

METHOD FOR THE PREPARATION OF NIOBIUM NITRIDE

This is a continuation of application Ser. No. 07/721,887, filed Jun. 27, 1991 now abandoned.

FIELD OF THE INVENTION

The present invention relates generally to the preparation of metal nitrides of the Group IV, V and VI metals and more particularly to the preparation and recovery of metal nitride from ferrometal alloys and nickel metal alloys.

BACKGROUND OF THE INVENTION

Exemplary of the preparation of the Group IV, V and VI metal nitrides is the preparation of niobium nitride. The preparation of niobium nitride from ferroniobium (FeNb) has, in the past, been done in a variety of circuitous ways. The high cost of recovering niobium nitride by the use of several of the known processes has deterred their commercial adoption.

Exemplary of the known methods include the production of niobium oxide ($Nb_2O_5$) from FeNb in a multiple step process. The niobium oxide can then be metallothermically or carbothermically reduced to yield metal suitable for further purification by melting. The metal can then be nitrided directly or the $Nb_2O_5$ can be nitrided with ammonia.

The typical extraction processes include chlorinating FeNb directly to produce ferric chloride ($FeCl_3$) and niobium pentachloride ($NbCl_5$) ) by passing chlorine through a bed of particulate FeNb held at a temperature of from about 500° C. to 1000° C.

The chlorination reaction can be characterized as follows:

$$FeNb + 4Cl_2 \rightarrow FeCl_3 + NbCl_5 + heat$$

This reaction is exothermic and once started produces considerable heat and must, therefore, be carefully controlled. The $FeCl_3$ and $NbCl_5$ produced must be subsequently separated and this is accomplished by passing the mixed chlorides in the vapor state through a heated bed of sodium chloride (NaCl) where the $FeCl_3$ forms a eutectic composition with the NaCl and is thereby removed from the vapor process stream. The $NbCl_5$ can then be subsequently condensed by cooling.

This chlorination step utilizes toxic chlorine gas at elevated temperatures and pressures potentially raising corrosion and, therefore, safety problems. Special equipment is necessary for handling the highly pressurized, corrosive liquid chlorine and it must be carefully vaporized, metered and fed into the reactor. Likewise, the most suitable material for reactor construction is graphite. Graphite is a brittle material which can fracture and fail abruptly after a short time in use in this environment. Further, the vaporized chlorine is normally used in excess to ensure complete reaction with the FeNb and the excess must subsequently be neutralized creating an expensive, undesirable by-product.

The separated condensed $NbCl_5$ can then be hydrolyzed by its addition to water and then the bath is neutralized and the insoluble product can be dried and then calcined, or calcined directly in a heated kiln in the presence of oxygen to produce $Nb_2O_5$. The hydrolysis and neutralization steps can produce undesirable byproducts and the drying and calcining steps are both energy intensive and expensive.

The $Nb_2O_5$ obtained as described can then be metallothermically reduced with aluminum powder in a batch reaction to form Nb metal according to the following equation:

$$3Nb_2O_5 + 10Al \rightarrow 6Nb + 5Al_2O_3 + heat$$

This reaction is very exothermic attaining temperatures in excess of the melting point of the products which are then separated by gravity while in the molten state. While expensive, metallothermic reduction is effective with good yields.

The other methods for Nb extraction from FeNb involve caustic or carbonate fusions, which when leached or washed, give niobium oxide which is fairly pure and may be purified further by chlorination as previously described or other means presently known to the art. Ultimately, the oxide must be metallothermically reduced as previously described, or carbothermically reduced to Nb metal.

The process of reducing $Nb_2O_5$ carbothermically is difficult to do on a production basis since doing so requires a large thermal input, vacuum vessels, and a careful balance of carbon to oxygen so that the resulting metal is not contaminated with either carbon or oxygen. If the carbon to oxygen ratio is maintained at nearly stoichiometric amounts, then the reaction proceeds rapidly until only a few percent of either remains unreacted. The reaction then proceeds slowly and it is quite difficult for it to reach completion. For this reason, carbothermic reduction is not currently used commercially.

Another method for extracting Nb from FeNb could theoretically be the direct electron beam melting and purification of FeNb by preferential vaporization of the Fe. This becomes very expensive in practice even though the melting point of FeNb is relatively low, a great amount of electrical power is needed to superheat and vaporize the relatively large amount of iron present. Though possible, it is not economically feasible.

Numerous synthesis techniques for niobium nitride preparation are given in the monograph "Hartstoffe", by Kieffer and Benesovsky (Springer-Verlag, Vienna, 1963), p. 317. Among the techniques reviewed therein, the following are noteworthy here.

First, partial hydrogen reduction of $Nb_2O_5$ to $Nb_2O_3$ can be employed followed by nitriding of the $Nb_2O_3$ in the presence of carbon. The potential of such a process is limited by the availability of high quality $Nb_2O_5$, and the previously described process difficulties in preparing $Nb_2O_5$ commercially suitable for such use.

Next, direct combination of pure niobium metal with nitrogen or ammonia can be employed. Since pure niobium metal is the penultimate product of niobium extractive metallurgy, such a route necessarily represents the most expensive possible for the subsequent production of the nitride.

Further, nitridation of $Nb_2O_5$ in the presence of carbon can be employed, as reported by Krishnamurthy, et al R&HM, March 1984, pages 41-45. This process requires difficult pyrovacuum treatment to remove both carbon and oxygen. Furthermore, since that process is intended to ultimately produce niobium metal, the nitride it produces has large amounts of oxygen and carbon.

Still further, it is possible to produce niobium nitride by the direct reaction of $Nb_2O_5$ with ammonia. U.S. Bureau of Mines Reports of Investigation 8075 (1975) and 8103 (1976) describes this work, which starts with costly $Nb_2O_5$ and ammonia and can also be used to produce niobium metal.

OBJECTS OF THE INVENTION

It is, therefore, an object of the present invention to provide a novel process for producing metal nitrides starting from the ferro and nickel alloys of the desired metals, while avoiding the difficulties present in the existing methods of extraction, which existing processes include the steps of chlorination, hydrolysis, calcination and aluminothermic reduction to produce the desired metal prior to nitridation.

It is a further object of the present invention to provide a novel method for producing niobium nitride, vanadium nitride, tantalum nitride and silicon nitride from their respective ferroalloys that requires less energy than the conventional processes identified hereinbefore and is less costly and easier to conduct than the conventional methods which require the extensive handling of hazardous and corrosive materials.

It is a further objective of the present invention to provide a process which avoids the production of $Nb_2O_5$ or Nb as the starting materials for the nitridation reaction and avoids extremes of temperature, pressure or the conditions of high vacuum or excessive times to force completion of the desired chemical reactions.

SUMMARY OF THE INVENTION

Exemplary of the preparation of metal nitrides according to the present invention, niobium nitride is prepared from ferroniobium alloys (FeNb) by first reacting the FeNb with hydrogen-containing gas to form hydrides of FeNb in sufficient quantity to render the FeNb and hydrogen reaction product friable and easily comminutable into small particles. Next, the particulate FeNb hydride product is then nitrided by reaction with a suitable source of nitrogen-containing gas at a sufficient temperature and for a sufficient period of time to form separate distinct solid phases of iron nitride and niobium nitride respectively.

DETAILED DESCRIPTION OF THE PREFERRED EMBODIMENT

Ferroniobium alloys are available having a wide range of compositions due to the homogeneity of the constituents in the alloy. FeNb alloys typically contain between 20% to 40% by weight iron and preferably more than 50% by weight niobium and most preferably between about 65% to 67% by weight niobium with the balance including iron and minor amounts of silicon and smaller amounts of aluminum, tantalum, phosphorous and titanium. Normally, ferroniobium alloys, as described, are difficult to crush or otherwise subdivide into easily reactive particle sizes.

Figure 1:
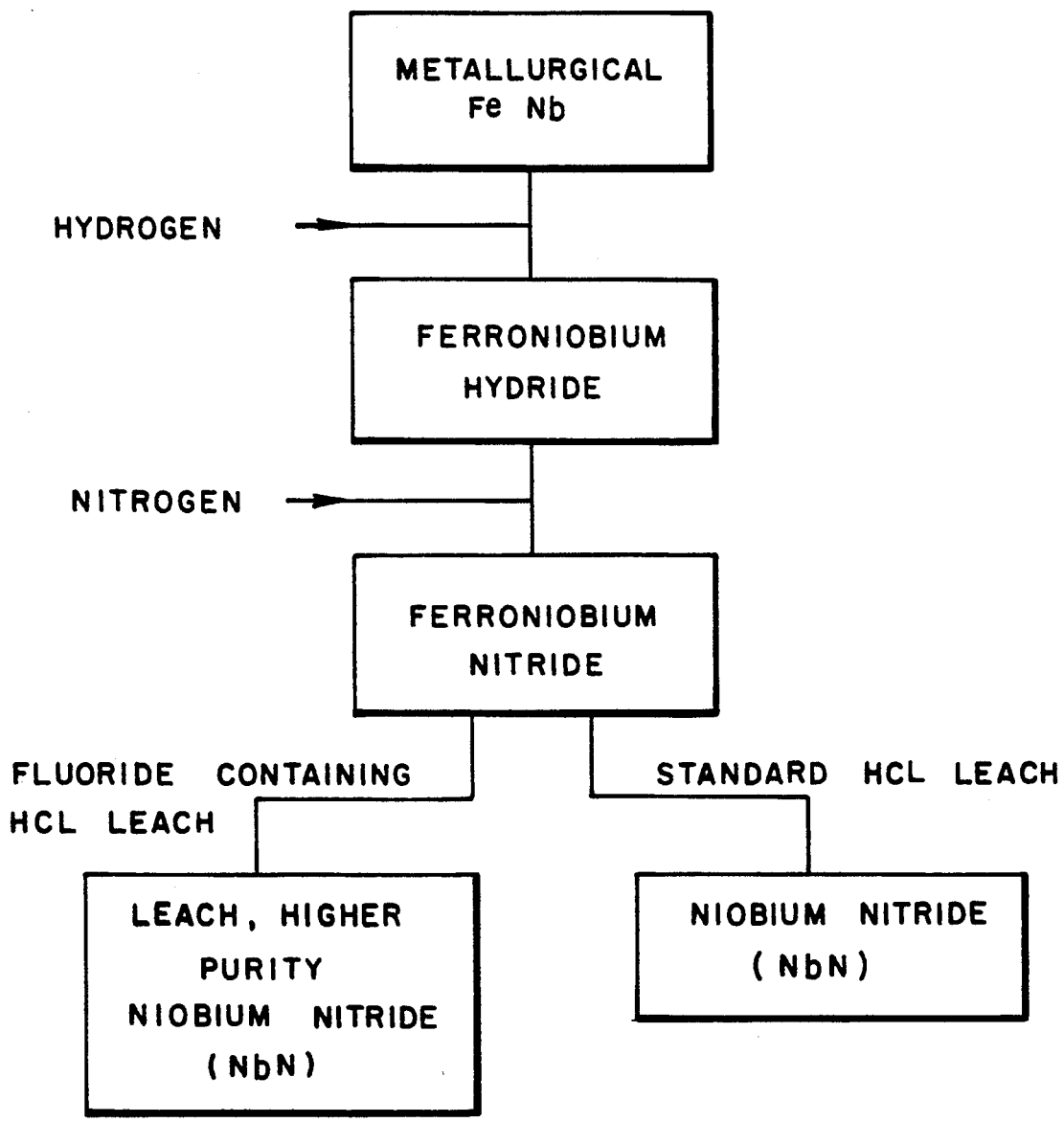
FIG. 1 is a schematic block diagram of the process of the present invention.

As shown in the schematic of FIG. 1, the FeNB is hydrided, as more fully described hereinafter, and then crushed or attritted in any conventional manner to make a small enough particle size, pulverulent material to sufficiently enhance the surface area of the hydrided product for the nitriding reaction to proceed smoothly. The hydrided material is then nitrided in an atmosphere of nitrogen, or ammonia, or nitrogen and hydrogen, or of any appropriate nitrogen-containing atmosphere that does not contain oxygen. The nitriding reaction must take place at a high enough temperature to proceed relatively quickly. Too high a temperature will promote sintering or melting together of the particles of the reaction mass. At too low a temperature, the nitriding reaction will proceed too slowly to be economically attractive. Preferably, the reaction should initially be conducted above about 800° C.

The use of temperatures below 500° C. while functional in that nitride formation will occur, will require a longer time to produce significant yields of the desired nitride products. The temperatures encountered during the exothermic nitriding reaction, if high enough, will beneficially affect the separation of the iron nitride and alloy metal nitride products by diffusion. This phase separation process results in improving the subsequent leachability of the iron nitride phase away from the niobium nitride phase.

Figure 3:
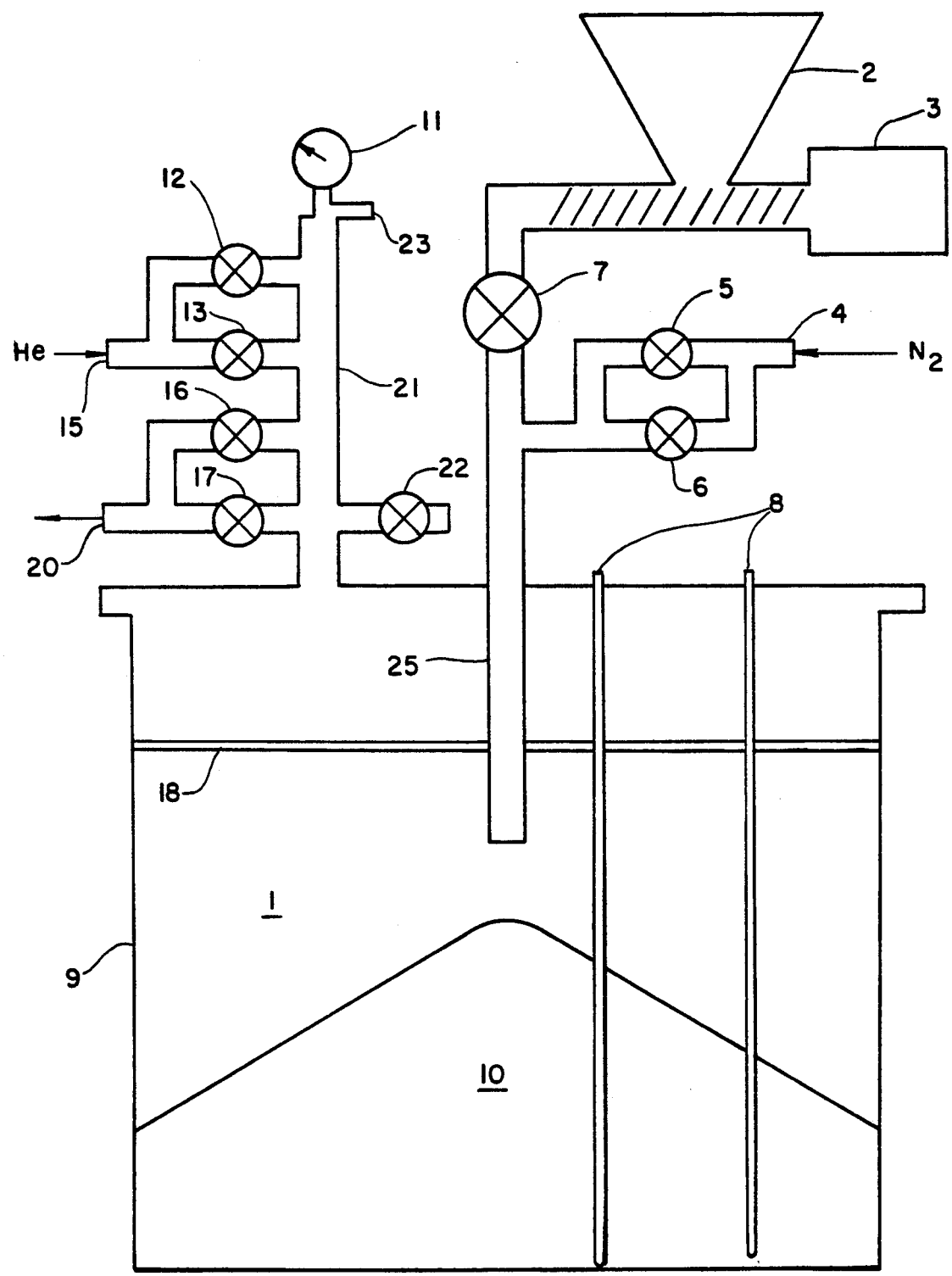
FIG. 3 is a schematic of the reaction vessel and system for practicing the method of the present invention.

In FIG. 3 the nitride reactor 1 is shown schematically containing nitride product 10 inside a sealed reaction vessel 9 equipped with a heat shield 18. The pulverized, sized, hydrided ferroniobium material is charged to feed hopper 2 which discharges to an auger drive 3 for conveying the hydride through an optional manual isolation valve 7, when open, and into the reaction vessel 9 through inlet conduit 25. Nitrogen-containing gas is introduced into the reaction vessel 9 through an inlet 4 and manual valve 5 or automatic valve 6 into the inlet conduit 25. As is described herein, the valves 5, 6 and 7 can be closed to provide a seal to the reactor during any desired stage of the reaction.

Whatever pressure is selected for operation, the pressure can be monitored by a visual pressure gauge 11 or by means of a pressure transducer 23 mounted on the conduit 21 which communicates with the interior of the reaction vessel 9. Pressure can be vented by means of automatic valve 17 or manual valve 16 and through pressure vent 20 which is in gaseous communication with conduit 21, respectively through these valves. Additionally, when it is desired to over pressure the reaction vessel with an inert gas, such as helium as shown, the inlet 15 is provided with gaseous communication with the conduit 21 through the manual valve 12 and the automatic valve 13.

With the described system, it is possible to introduce the nitrogen-containing gas into the reaction vessel 9 either intermittently or continuously after charging the reactor 9 with the ferroniobium hydride from the hopper 2 by means of the auger drive 3 and after closing the manual valve 7. When valves 7, 12, 13, 16, 17 and 22 are closed a desired pressure of nitrogen-containing gas can be achieved and observed and the rate of addition of the gas controlled, as one means of controlling the reaction rate. If desired, the vessel can be evacuated prior to the initiation of the reaction by pulling a vacuum through valve 22 with valves 5, 6, 7, 12, 3, 16 and 17 closed. Additionally, helium or any other inert gas can be alternatively introduced through valves 12 or 13 to sweep the reaction vessel of unwanted gases by alternatively pumping the vessel 9 down with a vacuum and flushing with an inert gas. The reaction vessel can also be equipped with external or internal heating and/or cooling means (not shown) and the temperature monitored, for example, by means of thermocouples located in the thermocouple wells 8. The thermocouples, not shown, can be placed at any height in the wells 8 to monitor the temperature of the reactants at any preselected location, or of the vessel cavity itself. Since the reaction is exothermic, the reaction vessel 9 is provided with an internal heat shield 18.

In operation, during the reaction, nitrogen-containing gas can be continuously introduced at inlet 4 and with the proper valve settings be vented at vent 20 to maintain a predetermined pressure. The reaction can be run either below atmospheric pressure or at or above atmospheric pressure to maintain a predetermined time-temperature profile for the reaction.

Figure 2A:
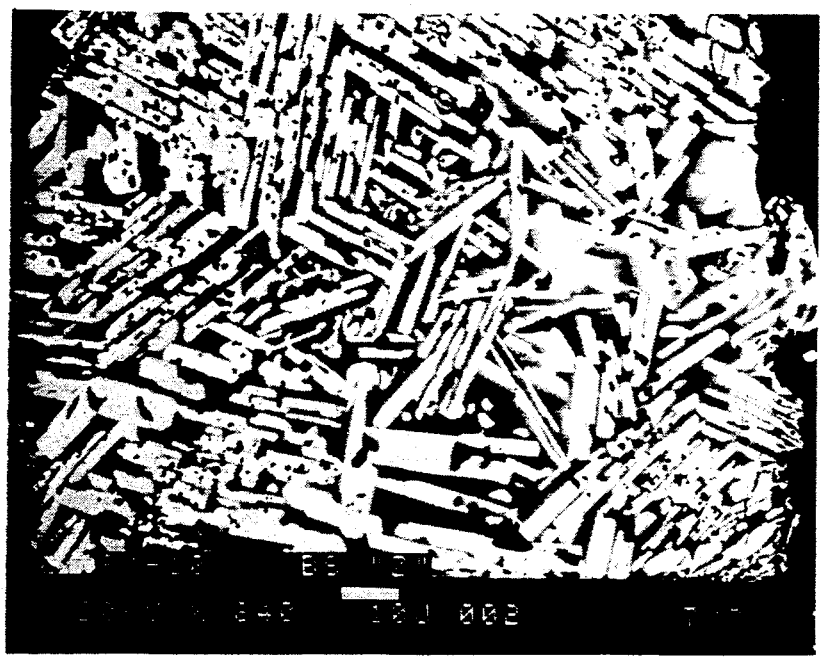
FIGS. 2a and 2b are photomicrographs at 840× and 1000× of the mixed nitrides prepared according to this invention.
Figure 2B:

FIGS. 2a and 2b are photomicrographs at 840 power and 1000 power magnification respectively of the product of the nitriding reaction and phase separation. The grey areas of the photomicrographs represents the iron nitride phase and the lighter or white areas are the niobium nitride phase. These photomicrographs show the distinct separation of these phases that occurs in the practice of the present invention.

Two reports published by the Bureau of Mines, Nos. RI8079 and RI8103, discuss nitriding the oxides of Ta, Nb and V in ammonia to form nitrides which may then be decomposed to the metal by melting in an arc or electron beam or by heating in a vacuum chamber. These reports do not, however, recognize the possibility of nitriding ferro or nickel metal hydrides.

The nitrides of Fe are normally quite soluble in mildly concentrated acids, especially in HCl of from 1 Normal to about 12 Normal. Other acids which could be used include hydrofluoric acid and sulfuric acid. Therefore, after nitriding, as described herein, the iron nitrides may be leached away from the niobium or other metal nitrides which are relatively insoluble in such acids. The nitride formation need not be stoichiometric, it is only necessary that enough nitrogen is reacted to affect the solubility of the Fe in acids. The relatively high temperature phase separation by diffusion, as shown in FIG. 2, also assists the subsequent leaching step by promoting the removal of the iron and iron nitrides away from the niobium or other metal nitrides. Optionally, leaching with an aqueous acid leach solution containing fluoride ions can advantageously be employed in substitution for the foregoing leach solution or in addition to it, to selectively remove unwanted soluble impurities such as silicon and phosphorous and their compounds.

The preparation of the nitrides of Ta, Nb and V is quite possible by the process of the present invention. Since Nb nitrides are soluble in a mixture of hydrofluoric and nitric acids and the tantalum nitrides and vanadium nitrides are slightly soluble in aqua regia, these acids would not be the best choices for leaching the iron, but would have utility for separation of those metal values in the leachate. Hydrochloric acid is inexpensive and works well in leaching the iron nitride, in addition to having a low environmental impact, and is relatively easily and inexpensively neutralized.

The following examples will illustrate the operation of the process of the present invention.

EXAMPLE 1

A charge of 8.4 lb of ferroniobium hydride product prepared as described herein by contacting ferroniobium with hydrogen gas at ambient and somewhat higher temperatures and up to about 15 psig pressure was rod milled, sized and placed in a lidded, cylindrical stainless steel vessel. The vessel was evacuated, purged with argon and then fed with nitrogen gas while the temperature of the vessel was raised by heating. The temperature was monitored. At a vessel temperature of about 538° C., the uptake of nitrogen became significant. Nitrogen was then continuously fed into the vessel. The flow was increased when necessary to maintain a positive pressure during the course of the reaction. As the uptake of nitrogen proceeded, the temperature of the reaction vessel rose over about one hour to a temperature of about 1250° C. due to the exothermic nature of the reaction. With continued maintenance of nitrogen feed, the temperature stayed over 1200° C. for one hour and then cooled slowly over about 2 hours to about 1150° C. It remained at 1150° C. for 19 hours under constant nitrogen flow and then allowed to cool to ambient temperature. The weight gain was 9.1% by weight of the original charge. Subsequent analysis revealed that the formation of iron nitride and niobium nitride was substantially complete.

EXAMPLE 2

A known amount of ferroniobium is contacted with hydrogen gas initially at room temperature at a pressure of up to 15 psig. The vessel containing the ferroniobium is first evacuated, then backfilled and overpressured with hydrogen and held at a positive pressure to allow time for uptake. The hydrogen level of the hydrided product is raised to from about 200 ppm to 2000 ppm, usually approximately 1200 ppm. The hydrogen-containing product is ground or milled to a particle size of less than 20 mesh, preferably less than 140 mesh.

The hydrided, ground ferroniobium is then contacted with nitrogen at elevated temperatures. The charge reacts rapidly and exothermically, with a large uptake of nitrogen and a sharp temperature rise. This step is accomplished by controlling the addition of the ground, hydrided ferroniobium to the vessel as the temperature is increased. The exothermicity of the reaction supplies a significant portion of the heat needed to raise the temperature of the vessel. After cooling, the product is crushed for leaching. The product is found to experience a weight gain of 8-12%, after exposure to nitrogen for 6-48 hours at a maximum temperature of from about 1100° C. to 1400° C.

A portion of the product of the reactions in this example is then contacted with dilute hydrochloric acid at moderate temperatures to leach away impurities. Here, the efficacy of the preceding steps became evident. The impurities including the iron nitride found are substantially leached away, whereas, ferroniobium which has not been treated by the above step is completely unaffected even by prolonged contact with strong hydrochloric acid. In the present process, there are no requirements for excessively strong acid, elevated temperatures or prolonged leaching times. For example, in one leach, 5 lb of nitrided product was added to 22.7 1 of 2 N HCl at 46° C. The temperature varied from 46° C. to 55° C. over 4 hours. The mixture was filtered and washed with 2 N HCl then 30 liters of distilled water. 1788 g of dried product was recovered. The assay of the product remaining after this standard leach is shown in Table 1.

A sample of the above leached nitride (50 g) was further leached. The sample was added to a solution of 7.15 g of $NH_4NF_2$ in 500 ml of 6 N HCl at 50° C. It was stirred for 4 hours, then filtered, washed and dried. The results are shown in Table 1 comparing the assay with the results of a standard leach.

TABLE 1

|  | After the Standard Leach | After the Fluoride Leach |
|---|---|---|
| Fe, % | 1.27 | 0.51 |
| Si, % | 0.91 | 0.04 |
| P ppm | 230 | <30 |

The product of the run after leaching was also compared to commercial niobium nitride. The X-ray diffraction pattern showed only peaks due to niobium nitride, NbN, in agreement with JCPDS Card No. 20-801. Lattice parameters were found to be as follows:

TABLE 2

|  | JCPDS Card File | Invention |
|---|---|---|
| $a_o$, Å | 2.960 | 2.96 |
| $c_o$, Å | 11.270 | 11.26 |

After ignition to a constant weight, the ratio of weights before and after ignition as shown in Table 3.

TABLE 3

|  | Commercial | Invention | Theoretical ($NbO_{2.5}/NbN$) |
|---|---|---|---|
| wt out/wt in | 1.255 | 1.250 | 1.243 |

The nitrides obtained by the practice of the present invention can be nitrides of metals selected from Group IV, V and VI. Preferably, niobium and vanadium and tantalum nitrides can be successfully formed in accordance with the processes described herein, and most preferably niobium nitride. Such nitrides, once formed, can be utilized in subsequent processes for preparing the respective metal oxides and subsequently the metals in high purity therefrom or the metals directly through the process of heating to denitride the metal nitride formed.

This invention has been described and claimed consistent with the best mode of practice presently understood by the inventors. The scope of the invention as defined in the following claims is, therefore, to be limited only by the applicable prior art.

We claim:

1. A process for the preparation of metal nitrides wherein the metal for forming said nitrides is contained in an alloy selected from the group consisting of ferro alloys and nickel alloys comprising the steps of:
   a) reacting said alloy with hydrogen containing gas in the absence of oxygen, at a sufficient temperature and a pressure up to about 15 psig and for a sufficiently long period of time to form a friable hydrided product,
   b) reacting the hydrided product from step a) in a nitrogen-containing gas atmosphere in the absence of oxygen at a sufficiently high temperature and a sufficiently high pressure, for a sufficiently long period of time to form iron or nickel nitride and alloy metal nitride compounds,
   c) separating the iron or nickel nitrides formed from the metal nitride composition formed to recover the metal nitride.

2. The method of claim 1, wherein the iron content of the ferro alloy is from about 20 to about 40 percent by weight.

3. The method of claim 1, wherein the hydrided alloy is comminuted to a particle size of less than about 140 mesh before reaction with a nitrogen containing gas.

4. The method of claim 1, wherein the ferro alloys are selected from the group consisting of ferroniobium alloys, ferrotantalum alloys, ferrovanadium alloys and ferrosilicon alloys.

5. The method of claim 4, wherein the nitriding reaction is conducted at a temperature of from about 500° C. to about 1400° C. for a sufficient period of time to render the mixed nitrided product ferromagnetic.

6. The method of claim 4, wherein the iron nitride is separated from the other nitrides present by dissolving the iron nitride in an aqueous acid leach.

7. The method of claim 4, wherein the acid for the acid leach is selected from the group consisting of hydrochloric acid and sulfuric acid.

8. The method of claim 7, wherein the acid leach contains fluoride ions.

9. The process of claim 4, wherein the product of the nitriding reaction is maintained at a high enough temperature for a sufficient period of time to promote separation by diffusion of the nitrides formed.

10. A process for the preparation of niobium nitride from ferroniobium comprising the steps of:
   a) reacting the ferroniobium alloy with hydrogen-containing gas in the absence of oxygen, at a sufficiently high temperature and pressure up to about 15 psig and for a sufficiently long period of time to form a friable hydrided product from the ferroniobium alloy,
   b) reacting the hydrided product from step a) in a nitrogen-containing gas atmosphere in the absence of oxygen at a sufficiently high temperature and a sufficiently high pressure, for a sufficiently long period of time to form iron nitride and niobium nitride compounds,
   c) separating the iron nitride compound formed from the niobium nitride compound formed to recover the niobium nitride.

* * * * *